Oct. 7, 1924.

H. P. KRAFT

VALVE CAP

Filed Dec. 14, 1922

1,510,687

INVENTOR:
Henry Phillip Kraft,
By Attorneys,
Fraser, Turk & Myers

Patented Oct. 7, 1924.

1,510,687

UNITED STATES PATENT OFFICE.

HENRY PHILLIP KRAFT, OF RIDGEWOOD, NEW JERSEY.

VALVE CAP.

Application filed December 14, 1922. Serial No. 606,893.

*To all whom it may concern:*

Be it known that I, HENRY PHILLIP KRAFT, a citizen of the United States of America, residing in Ridgewood, in the county of Bergen and State of New Jersey, have invented certain new and useful Improvements in Valve Caps, of which the following is a specification.

This invention relates to caps for tire valves or the like, and aims to provide certain improvements therein.

The invention is particularly directed to a valve cap for screwing on the nipple of a valve casing or stem and closing the end thereof with a leak-tight joint. It is very desirable that the rim nut used in connection with pneumatic tire valves shall be capable of passing over the cap so that it can be applied or removed while the cap is in place; it is desirable also that the dust cap shall be capable of passing over the cap and engaging the thread of the valve casing, so that the use of bushings may be avoided. In the smaller sizes of valves it is difficult to construct a cap which will permit these two operations, and at the same time provide a packing washer within the cap which will maintain its position and be adequately protected against spreading or inward distortion.

According to the present invention I provide a cap of relatively small diameter sufficient to permit the passage of a rim nut or dust cap, and which is provided with a packing washer preferably of dome shape, and properly swivelled and reinforced, and which is also adapted for easy insertion and effective retention within the cap. In the preferred form the cap has a dome-shaped packing washer with an anti-friction or swivelling plate above it, the plate being of such diameter as to pass within the screw-threaded body portion of the cap, and having a depending flange, which, however, does not fully enclose the washer, the latter being made of substantially the internal diameter of the body portion, but having a flange projecting laterally beneath the swivelled plate, and being of sufficient diameter to form a retaining member to hold the washer in place.

In the drawings, wherein I have shown the preferred form of the invention,—

Figure 1:
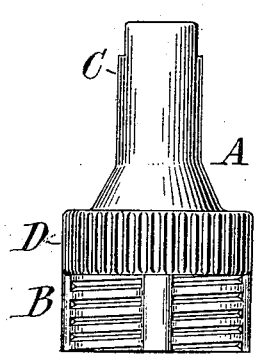
Figure 1 is an elevation of the cap.
Figure 3:
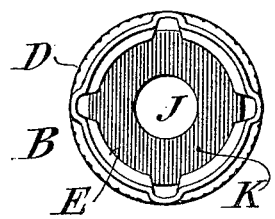
Fig. 3 is an underside view.
Figure 2:
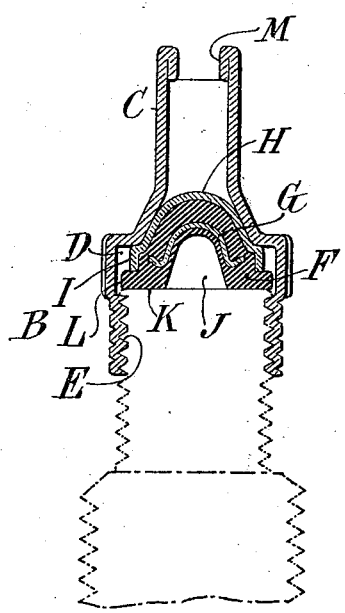
Fig. 2 is a diametrical section.
Figure 4:
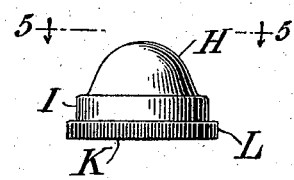
Fig. 4 is an elevation of the packing washer.
Figure 5:
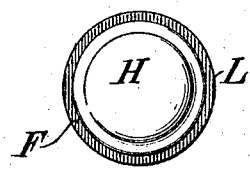
Fig. 5 is a plan on the line 5—5 in Fig. 4.
Figure 6:
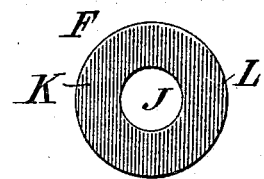
Fig. 6 is an underside view.

Referring to the drawings, let A indicate the cap as a whole, having a body portion B, and preferably also a screw-driver projection C. The body portion B is slightly enlarged at its top, as shown at D, which on the exterior provides a knurled grasping portion, and on the interior provides a shallow recess above the threads E. The exterior diameter of the cap is such that it is no greater than the smaller sizes of motor-car valves, one of which is indicated in Fig. 2. This permits dust caps or rim nuts to be applied to the valve casing when the cap is in place thereon.

The packing washer provided by the present invention comprises a rubber gasket F which preferably has a reinforcing dome-shaped plate G moulded in it, and above it is the swivelling plate H. In the type of packing washer shown the gasket and plate H are curved on their upper side, the plate fitting in a conical recess formed between the screw-driver projection and the body of the cap.

In any event the plate is so shaped as to provide what is in effect a depending flange I for the lateral protection of the washer, the plate being, however, of sufficiently small diameter to pass through the threaded portion E. The washer F is formed with the usual recess J for the reception of the valve pin, and the seating face K for contacting against the upper edge of a valve nipple. In addition in the present structure the washer is formed with a lateral flange L beneath the flange I. This provides a wide seating face, and makes sure of an adequate contacting surface with the nipple. The flange L preferably has an outside diameter which is greater than the diameter of the threaded portion E. The result of this construction is that when the washer is forced inwardly through the threaded portion, the flange yields until the washer is seated, the flange entering the enlarged portion D of the cap body, and being thereafter held in place by engagement of the flange L with the threaded section below it.

Thus the packing washer is prevented from falling out of the cap, while at the same time lateral distortion either outwardly or inwardly is diminished or avoided.

The construction thus described can be availed of in the reduced diameter of the cap which is necessary to pass through a dust cap and rim nut.

Preferably the metal of the cap is reduced to as fine a gauge as possible, and the screwdriver projection is reinforced by turning in the metal at M, so that the cap has abundant strength at this point to resist the strains occasioned by screwing the valve insides in and out.

The swivelling plate H is best connected to the washer, preferably by vulcanization. The shape of the washer is not strictly essential, although it is by preference in some form approximating that of a dome; that is to say, it has a central recess and a portion extending over it, so that it entirely encloses the valve nipple when in use.

While I have shown and described one form of the invention, it will be understood that I do not wish to be limited thereto, since various changes may be made therein without departing from the spirit of the invention.

What I claim is:—

1. A valve cap or the like, having a threaded portion adapted to fit on a valve casing, a packing washer above said threaded portion, having a swivelling plate formed with a depending flange encompassing the washer for lateral protection thereof, and the washer having a flange extending laterally beyond the depending flange of the swivelling plate.

2. A valve cap or the like, having a threaded portion and an enlarged portion above the threaded portion, a packing washer having a swivelling plate formed with a depending flange encompassing the washer for lateral protection thereof, and the packing having a lateral flange extending beyond said depending flange, the swivelling plate being of a diameter to pass through the threaded portion without distortion, and the flange on the washer being of a diameter to require distortion in passing through the threaded portion and fitting within said enlarged portion.

3. A packing washer for caps or the like, comprising a washer portion and a swivelling plate, the swivelling plate being connected to the washer portion and having a depending flange, the swivelling plate enclosing the top and outer side of the washer portion, and the washer portion having a lateral flange extending beyond the lower edge of the depending flange.

In witness whereof, I have hereunto signed my name.

HENRY PHILLIP KRAFT.